No. 727,496. PATENTED MAY 5, 1903.
D. TOMMASI.
PLATE FOR ELECTRIC ACCUMULATORS.
APPLICATION FILED AUG. 3, 1901.
NO MODEL. 2 SHEETS—SHEET 1.
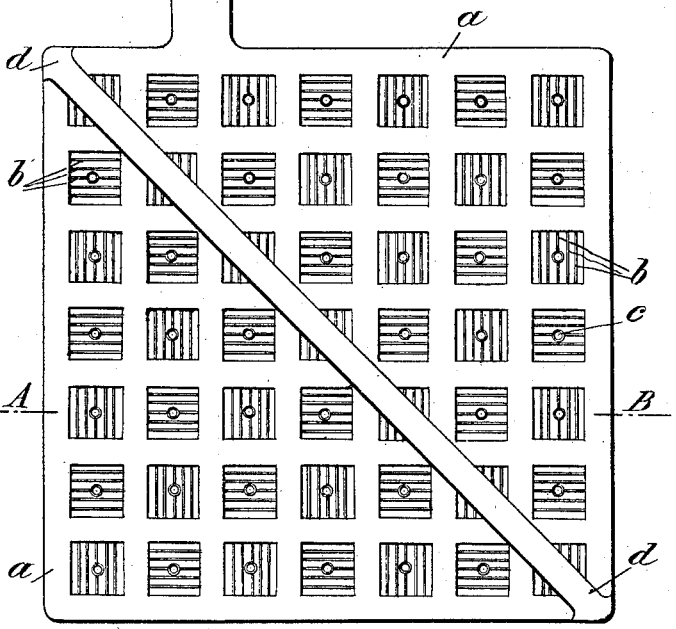
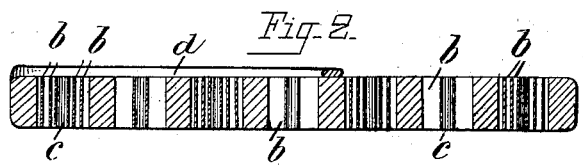
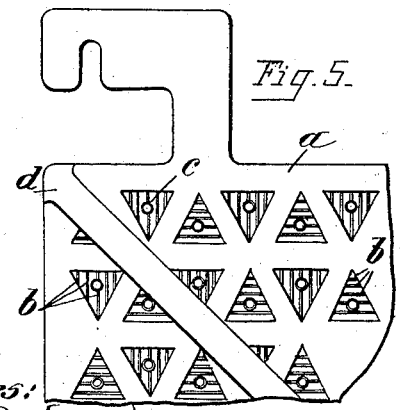 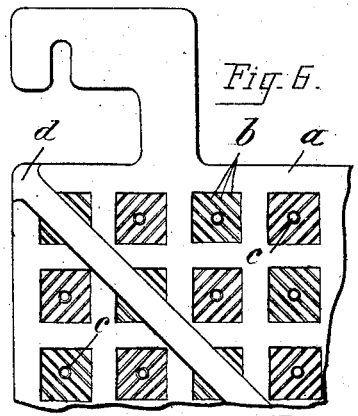

No. 727,496. PATENTED MAY 5, 1903.
D. TOMMASI.
PLATE FOR ELECTRIC ACCUMULATORS.
APPLICATION FILED AUG. 3, 1901.
NO MODEL. 2 SHEETS—SHEET 2.
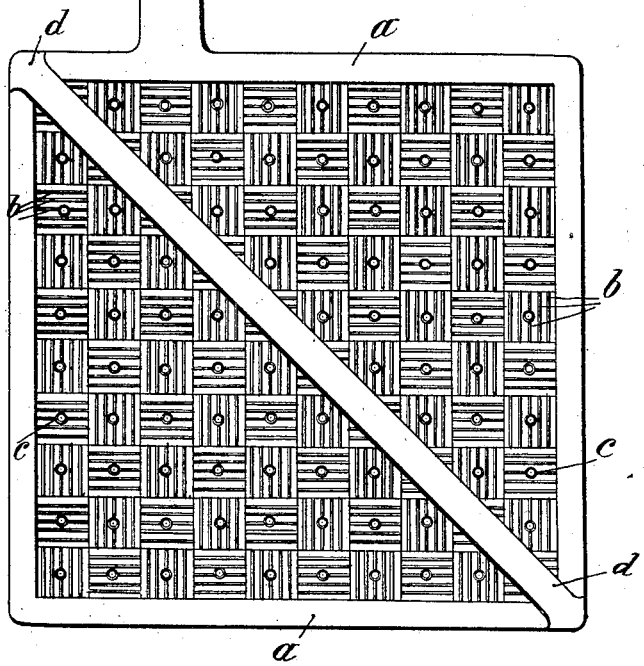
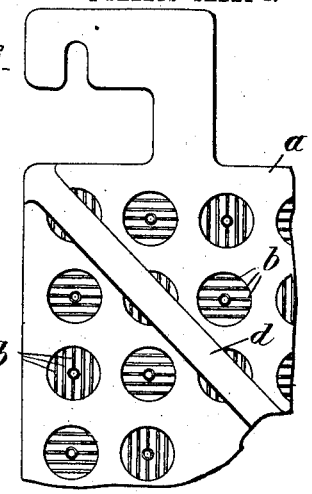
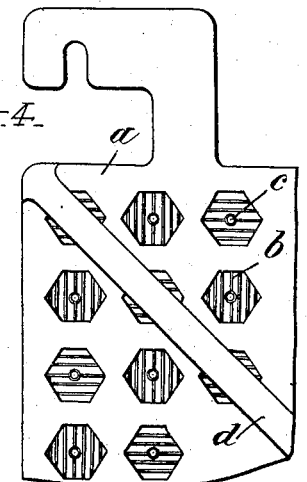
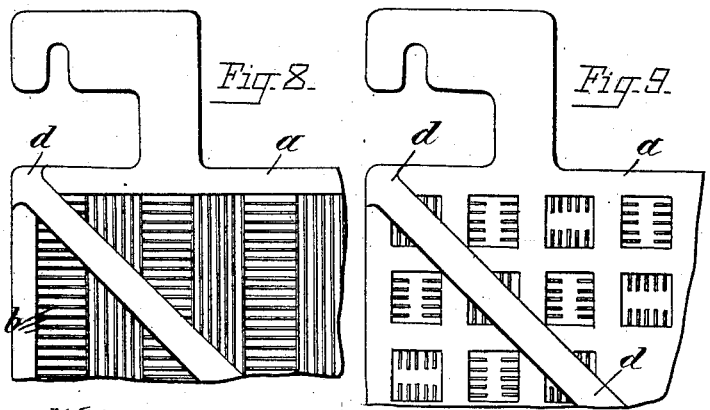
Witnesses:
Inventor
Donato Tommasi
By Munn
Attorneys No. 727,496. Patented May 5, 1903.

UNITED STATES PATENT OFFICE.

DONATO TOMMASI, OF PARIS, FRANCE.

PLATE FOR ELECTRIC ACCUMULATORS.

SPECIFICATION forming part of Letters Patent No. 727,496, dated May 5, 1903.

Application filed August 3, 1901. Serial No. 70,818. (No model.)

*To all whom it may concern:*

Be it known that I, DONATO TOMMASI, engineer, of 7 Rue des Immeubles Industriels, in the city of Paris, Republic of France, have invented Improvements in Plates for Electric Accumulators, of which the following is a full, clear, and exact description.

This invention has for its object such a construction of accumulator-plate as to retain the active material, permit of the diffusion of the electrolyte through the mass, and also of the uniform distribution of the current in all parts of said mass.

My system of accumulator-plate is essentially characterized by the following points, viz: first, the employment of strips placed in close proximity to each other in the empty spaces of the lead grid or frame of the plate, said strips serving to retain the active material and permit of the uniform distribution of the current throughout the mass; second, the employment of a diagonal conducting-strip upon one face of the plate, said strip extending from the angle corresponding to the point of entry of the current and serving to insure a uniform distribution of the current through all parts of the plate.

In order that the object of my invention may be readily understood, I have illustrated it in principle and by way of example in the accompanying drawings, wherein—

Figure 1 represents an elevation of my system of plate. Fig. 2 is a cross-section on line A B, Fig. 1, looking toward the top thereof. Figs. 3, 4, 5, and 6 represent modifications in the form of the empty spaces in the lead frame. Figs. 7 and 8 show two modifications in which the lead frame has no interior divisions, the divisions of the compartments being constituted by the strips themselves. Fig. 9 shows another modification in which the strips extend only partly across the length or breadth of the empty spaces in the lead frame. Fig. 10 is a modification of this latter arrangement.

The same letters of reference denote like parts in all the figures.

As shown in Figs. 1 and 2, each of the empty spaces of the lead frame $a$ contains closely-juxtaposed strips $b$, whereby to retain the active material and conduct the current to the different points of its mass. The strips of each two adjacent groups are disposed at right angles each to those of the other, the ones being vertical and the others horizontal, whereby the expansion of the plate takes place in both directions and is consequently much less sensible. The central strip of each empty space carries a small lead-eye $c$ to give passage to the electrolyte and permit its diffusion throughout the mass of active material. When the empty spaces are large, several such eyes $c$ would be used at different points to facilitate the uniform circulation of the electrolyte. Furthermore, the plate has upon one or both faces a diagonal conducting strip or strips $d$ to enable the current to pass directly to all parts of the plate and insure a uniform distribution of the current. The empty spaces in the lead frame may be of any suitable form—for example, square, as in Fig. 1, circular, as in Fig. 3, polygonal, as in Fig. 4, or triangular, as in Fig. 5—while the strips may also be arranged in any other suitable manner—as, for example, parallel to one of the diagonals of the recess, as in Fig. 6. The divisions between the cells in which the active material is contained will be made as narrow as possible, and the thickness may even be only that of a mere strip, as shown in Figs. 7 and 8. The strips $d$ are each in contact with the plate entirely across the face thereof, so as to secure the distribution of electricity as uniformly as possible. The strips may only extend partly across the cell, as in Fig. 9, and in this case they may be either at opposite sides or upon all four sides of the recess. In certain cases the strips may be serrated, as shown in Fig. 10. The lead frame may also have recesses on its external faces to receive the active material.

The active material is filled into all the empty spaces in my plate constituted as hereinbefore specified and is retained therein by the strips which traverse the said spaces, the active material which obstructs the eyes $c$ being afterward removed to allow the electrolyte to come freely in contact with all parts of the active material. This arrangement thus prevents the formation of concentration-currents, by reason of the perfect diffusion of the electrolyte throughout all parts of the active material.

My system of accumulator-plate presents the following advantages:

First. For equal volumes the plates of my system are much lighter than those now used.

Second. The active material being retained by a large number of strips cannot become detached, while its contact at a large number of points with the strips which are conductive insures uniform distribution of the current at all points of the mass of active material, and hence the resistance of electrode is diminished, and consequently its formation is more rapid. Moreover, the charge and discharge may be more intense without disintegration or heating of the active material.

Third. The diagonal conducting-strip insures uniform distribution of the current over all parts of the plate.

It is to be understood that lead-wires may be substituted for the lead-strips and that the form and dimensions of my system of plate and the accessory arrangements may be modified to suit different cases, as well as the nature of the metal or composition of the alloy.

I claim—

1. An accumulator-plate having strips spaced apart for holding active material, divers of said strips being provided with tubular eyes integral therewith for permitting the electrolyte to circulate through said plate.

2. An accumulator-plate, having strips spaced apart and disposed in separate groups, the strips of one group occupying a different angle relatively to the strips of another group in order to promote uniformity of expansion and contraction of said plate, and a comparatively long strip connected with the opposite extremities of said plate and extending diagonally across one face of the same.

3. An accumulator-plate, having strips spaced apart and disposed in separate groups, the strips of one group occupying a different angle relatively to the strips of another group to promote uniformity of expansion and contraction of said plate, divers of said strips being provided with tubular eyes integral therewith to permit circulation of the electrolyte through the plate, and a comparatively long strip connected with opposite extremities of said plate and extending diagonally across one face of said plate.

The foregoing specification of my improvements in plates for electric accumulators signed by me this 19th day of July, 1901.

DONATO TOMMASI.

Witnesses:
EDWARD P. MACLEAN,
MAURICE H. PIGNET.